United States Patent
Howard et al.

(10) Patent No.: US 11,546,176 B2
(45) Date of Patent: *Jan. 3, 2023

(54) SYSTEM AND METHOD FOR AUTHENTICATION AND CRYPTOGRAPHIC IGNITION OF REMOTE DEVICES

(71) Applicant: Rockwell Collins, Inc., Cedar Rapids, IA (US)

(72) Inventors: Sean Howard, Cedar Rapids, IA (US); James A. Marek, Anamosa, IA (US); Jonathon C. Skarphol, Robins, IA (US); Edward C. Tubbs, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 231 days.

This patent is subject to a terminal disclaimer.

(21) Appl. No.: 17/003,543

(22) Filed: Aug. 26, 2020

(65) Prior Publication Data
US 2022/0070008 A1 Mar. 3, 2022

(51) Int. Cl.
*H04L 9/32* (2006.01)
*G06F 21/60* (2013.01)
(Continued)

(52) U.S. Cl.
CPC .......... *H04L 9/3271* (2013.01); *G06F 21/602* (2013.01); *H04L 9/0894* (2013.01);
(Continued)

(58) Field of Classification Search
CPC ... H04L 9/3271; H04L 9/0894; H04L 9/3268; H04L 63/0442; H04L 63/123;
(Continued)

(56) References Cited

U.S. PATENT DOCUMENTS 6,263,437 B1 * 7/2001 Liao ...................... H04L 9/0841
713/153
7,747,851 B1 * 6/2010 Robinson .............. H04L 9/3265
726/29
(Continued)

FOREIGN PATENT DOCUMENTS

BR 102016017987 A2 * 2/2017 ............. G06F 21/34
CA 2937646 A1 * 2/2017 ............. G06F 21/34
(Continued)

OTHER PUBLICATIONS

Marek, James A. et al., "A Cost Effective High-Assurance Layered Solution for MLS Test, Training, and Live Virtual Constructive (LVC)", Australasian Simulation Congress, SimTecT 2016, 7 pages.
(Continued)

*Primary Examiner* — Shahriar Zarrineh
(74) *Attorney, Agent, or Firm* — Suiter Swantz pc llo (57) ABSTRACT

A method of remotely initializing at least one device is disclosed. The method includes initializing at a local host a cryptographic authorization sequence after receiving a secure input value. The method further includes receiving at a local host cryptographic controller a first authorization request from a first remote device. After a challenge-response authentication protocol, the first remote device is authenticated and receives a public key infrastructure certificate. The method includes receiving at a first remote cryptographic controller a second request from a second remote device. After a challenge-response authentication protocol, the first remote device is authenticated, but does not receive a public key infrastructure certificate. A system for remotely initiating at least one device is also disclosed.

6 Claims, 8 Drawing Sheets

(51) Int. Cl.
*H04L 9/08* (2006.01)
*H04L 9/40* (2022.01)

(52) U.S. Cl.
CPC ........ *H04L 9/3268* (2013.01); *H04L 63/0442* (2013.01); *H04L 63/123* (2013.01); *H04L 2209/84* (2013.01)

(58) Field of Classification Search
CPC . H04L 2209/84; H04L 9/0836; H04L 9/3263; H04L 63/064; H04L 63/105; H04L 67/12; H04L 9/3234; H04L 63/0853; G06F 21/602; G06F 21/35; H04W 12/64; H04W 12/06
See application file for complete search history.

(56) References Cited

U.S. PATENT DOCUMENTS

| | | | | |
|---|---|---|---|---|
| 7,961,076 | B2 * | 6/2011 | Kelley | B60R 25/257 340/5.72 |
| 7,984,291 | B2 * | 7/2011 | Eronen | H04L 63/08 455/432.1 |
| 8,494,154 | B2 * | 7/2013 | Shah | H04L 9/0869 380/44 |
| 8,607,065 | B2 * | 12/2013 | Thom | H04L 63/0853 713/193 |
| 8,996,869 | B1 | 3/2015 | Canter et al. | |
| 9,948,614 | B1 | 4/2018 | Howard et al. | |
| 10,116,446 | B2 | 10/2018 | Anthony et al. | |
| 10,255,420 | B2 | 4/2019 | Anthony et al. | |
| 2002/0023223 | A1 * | 2/2002 | Schmidt | H04L 9/3263 713/175 |
| 2004/0243808 | A1 * | 12/2004 | Ishiguro | G06F 21/10 713/176 |
| 2004/0268142 | A1 * | 12/2004 | Karjala | H04L 63/0823 726/15 |
| 2007/0226779 | A1 | 9/2007 | Yokomitsu et al. | |
| 2007/0283159 | A1 * | 12/2007 | Borsa | G07C 9/23 713/182 |
| 2012/0260100 | A1 * | 10/2012 | Applegate | G06F 21/72 713/182 |
| 2012/0321076 | A1 * | 12/2012 | Shah | H04L 9/0897 380/44 |
| 2019/0028443 | A1 * | 1/2019 | Chin | G07C 9/00571 |
| 2021/0288822 | A1 * | 9/2021 | Sorensen | H04L 9/3268 |
| 2021/0367794 | A1 * | 11/2021 | Datko | H04L 63/0823 |

FOREIGN PATENT DOCUMENTS

| | | | | | |
|---|---|---|---|---|---|
| CN | 101473628 | A | * | 7/2009 | ........ H04L 63/0272 |
| CN | 104469763 | B | * | 7/2018 | ........... H04W 12/06 |
| CN | 114124362 | A | | 3/2022 | |
| EP | 3672197 | A1 | * | 6/2020 | ............ B64D 31/06 |
| GB | 2543889 | B | | 2/2018 | |
| GB | 2573063 | A | | 10/2019 | |
| JP | H10301671 | A | * | 11/1998 | |
| WO | WO-0245336 | A1 | * | 6/2002 | ........ H04L 63/0428 |
| WO | WO-2010091172 | A1 | * | 8/2010 | ............ B60R 25/04 |

OTHER PUBLICATIONS

Extended Search Report in European Application No. 21192753.8, dated Jan. 19, 2022, 12 pages.
Huawei et al., "A mutual authentication and session key generation scheme between remote UE and Network over the relay", 3GPP Draft; S3-161695_A Mutual Authentication Scheme for Relay Security, 3rd Generation Partnership Project (3GPP), Mobile Competence Centre; 650, Route Des Lucioles; F-06921 Sophia-Antipolis Cedex, vol. SA WG3, Nov. 6, 2016 (Nov. 6, 2016), XP051185782, URL:http://www.3gpp.org/ftp/Meetings_3GPP_SYNC/SA3/Docs/ [retrieved on Nov. 6, 2016].

* cited by examiner

SYSTEM AND METHOD FOR AUTHENTICATION AND CRYPTOGRAPHIC IGNITION OF REMOTE DEVICES

BACKGROUND

Cryptographic controllers are employed in a variety of infrastructures to secure access to certain devices or network resources. Existing systems typically require that a device remain unauthorized (i.e. not sending or receiving secure data) until initialized or powered on. Cryptographic initialization schemes are commonly implemented according to contextual security requirements. For example, several applications require cryptographic ignition keys (CIKs) for device initialization, requiring that a user directly enter a code into a user interface of the device or physically insert a CIK into a receiving port. In some applications, the user may be alternately enabled to bring the CIK within threshold proximity of the device, such as in the case of electromagnetic or optically interfacing CIKs.

Under some circumstances, a device may be remotely initialized by a CIK-initialized device. In this CIK-less method, a remote device, such as a device on board an aircraft, may send an authorization request to the CIK-initialized device, typically a ground-based device. CIK-initialized device may then authorize the remote device for device initialization.

Once the remote device is out of range of the ground-based CIK-initialized device, the remote device may lose authorization. For example, power surges, software faults, or other accidental zeroization incidents may de-authenticate the remote device, and require the aircraft to return to within range of the ground-based CIK-initialized device in order to reinitiate. Re-initiation in this manner results in a loss of time and increased fuel costs, as well as increasing the potential for failing mission objectives. Therefore, it would be advantageous to provide a solution that cures the shortcomings described above.

SUMMARY

A method of remotely initializing at least one device is disclosed. In one or more embodiments, the method includes initiating, at a local host device, a cryptographic authorization sequence after receiving a secure input value. The method further includes the receiving, at the local host device, a first authorization request including a first encryption value from a first remote device in communication with the local host device. The method may further include receiving, at a local cryptographic controller, the first encryption value from the local host device in communication with the local cryptographic controller. The method may further include encoding, at the local cryptographic controller, the first encryption value utilizing a first private key for the encoding. The method may further include sending the first encoded encryption value from the local cryptographic controller to the local host device. The method may further include sending, from the local host device to the first remote device, a first approval response including the first encoded encryption value. The method may further include receiving, at the first remote device, the first approval response including the encoded encryption value. The method may further include receiving, at a first remote cryptographic controller, the first encoded encryption value for verification from the first remote device in communication with the first remote cryptographic controller. The method may further include decoding, at the first remote cryptographic controller, the first encryption value utilizing a first public key for the decoding. The method may further include initializing the first remote device using the first approval response when the first encoded encryption value is decoded at the first remote cryptographic controller and the first encryption value is verified, wherein initializing the first remote device authorizes transitioning the first remote device to an active state to enable the first remote device to engage in one or more communications over a secured network. The method may further include sending, from the first remote device to the local host device, a first acknowledgement message to acknowledge initialization of the remote device. The method may further include receiving, at the local host device, the first acknowledgement message from the first remote device. The method may further include securely sending, from the local host device to the first remote device, a public key infrastructure certificate containing the second private key. The method may further include securely receiving, at the first remote device, the public key infrastructure certificate containing the second private key.

In some embodiments of the method, the method may further include receiving, at the first remote device, a second authorization request including a second encryption value from a second remote device in communication with the first remote device. The method may further include receiving, at the first remote cryptographic controller, the second encryption value from the first remote device in communication with the first remote cryptographic controller. The method may further include encoding, at the first remote cryptographic controller, the second encryption value utilizing a second private key for the encoding. The method may further include sending the second encoded encryption value from the first remote cryptographic controller to the first remote device. The method may further include sending, from the first remote device to the second remote device, a second approval response including the second encoded encryption value. The method may further include receiving, at the second remote device, the second approval response including the second encoded encryption value. The method may further include receiving, at a second remote cryptographic controller, the second encoded encryption value for verification from the second remote device in communication with the first remote cryptographic controller. The method may further include decoding, at the second remote cryptographic controller, the second encryption value utilizing a second public key for the decoding. The method may further include initializing the second remote device using the second approval response when the second encoded encryption value is decoded at the second remote cryptographic controller and the second encryption value is verified, wherein initializing the second remote device authorizes transitioning the second remote device to an active state to enable the second remote device to engage in one or more communications over the secured network. The method may further include securely sending, from the second remote device to the first remote device, a second acknowledgement message to acknowledge initialization of the second remote device. The method may further include securely receiving, at the first remote device, the second acknowledgement message from the second remote device.

In some embodiments of the method, the first remote device is implemented within at least one of a vehicle, machinery, or equipment.

In some embodiments of the method, the first private key is stored by the local cryptographic controller and the first public key is stored by the first remote cryptographic controller.

In some embodiments of the method, the second private key is stored by the first remote cryptographic controller and the second public key is stored by the second remote cryptographic controller.

In some embodiments of the method, the second remote device is configured to be incapable of initializing a third remote device In some embodiments of the method at least one of the first encryption value or the second encryption value comprises at least one of a random value, a time value, or an electronic serial number.

A system for remotely initializing at least one device is also disclosed. In one or more embodiments, the system includes a first private and public key pair. The system further includes a local host device. The local host device is configured to initiate a cryptographic authorization sequence after receiving a secure input value. The local host device is further configured to receive a first authorization request. The local host device is further configured to send a first approval response including a first encoded encryption value. The host local device is further configured to receive a first acknowledge message. The host local device is further configured to send a public key infrastructure certificate. The system further includes a first remote device in communication with the local host device. The first remote device is configured to send the first authorization request including a first encryption value to the local host device. The first remote device is further configured to receive the first approval response and the first encoded encryption value from the local host device. The first remote device is further configured to send the first acknowledge message to the local host device. The first remote device is further configured to receive the public key infrastructure certificate from the local host device. The system further includes a local cryptographic controller in communication with the local host device. The local cryptographic controller is configured to receive from the local host device, the first encryption value. The local cryptographic controller is further configured to encode the first encryption value utilizing a first private key. The local cryptographic controller is further configured to send the first encoded encryption value to the local host device. The system further includes a first remote cryptographic controller in communication with the first remote device. The first remote cryptographic controller configured to verify the first encryption value received from the first remote device by decoding the first encoded encryption value with a first public key paired with the first private key. The first remote cryptographic controller is further configured to send a first acknowledge message to the first remote device verifying the first approval response is valid, the first remote device configured to initialize to an active state upon receipt of the acknowledge message, and the first remote device being further configured to securely communicate after initialization.

In some embodiments of the system, the first remote device is further configured to: receive a second authorization request, send a second approval response including a second encoded encryption value, and receive a second acknowledge message.

In some embodiments of the system, the system further includes a second private and public key pair and a second remote device in communication with the first remote device the second remote device is configured to send the second authorization request including a second encryption value to the first remote device. The second remote device is further configured to receive the second approval response and the second encoded encryption value from the first remote device. The second remote device is further configured to send the second acknowledge message to the first remote device.

In some embodiments of the system, the first remote cryptographic controller is further configured to receive from the first remote device, the second encryption value. The first remote cryptographic device is further configured to encode the second encryption value utilizing a second private key. The first remote cryptographic device is further configured to send the second encoded encryption value to the first remote device.

In some embodiments of the system, the system further includes a second remote cryptographic controller in communication with the first remote device. The second remote cryptographic controller is configured to verify the second encryption value received from the second remote device by decoding the second encoded encryption value with a second public key paired with the second private key. The second cryptographic controller is further configured to send a second message to the second remote device verifying the second approval response is valid, the second remote device being configured to initialize to an active state upon receipt of the second message, and the second remote device being further configured to securely communicate after initialization.

In some embodiments of the system the first remote device is implemented within a vehicle, machinery, or equipment.

In some embodiments of the system, the first private key is stored by the local cryptographic controller and the first public key is stored by the remote cryptographic controller.

In some embodiments of the system, the second private key is stored by the first remote cryptographic controller and the second public key is stored by the second remote cryptographic controller.

In some embodiments of the system, the second remote device is configured to be incapable of initializing a third remote device.

In some embodiments of the system, at least one of the first encryption value or the second encryption value comprises at least one of a random value, a time value, or an electronic serial number.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

FIGS. 1 through 5 generally illustrate a cryptography scheme for initializing one or more remote devices in communication with at least one local host device. The system and method illustrated by the following embodiments provide an extensible framework enabling a one-to-many relationship between a local device directly accessed by a user and one or more remote devices. The framework also enables a hierarchical frame work, enabling a one-to-many relationship between an authenticated remote device (e.g., via a CIK-less mechanism that requires a ground station for ignition) and one or more unauthenticated remoted devices.

The authorization scheme allows the remote devices to be unauthenticated and run in an insecure mode until initialized. Remote initialization will allow for user convenience and reduced foot print. The remote cryptographic initialization scheme is further extensible to ignition sources located within any machinery or equipment where user space is limited or where remote access is advantageous. For instance, the advantages of remote cryptographic initialization will be appreciated in blue water scenarios, where the remote device has ventured beyond the range of a local authenticating device, and must return to the local device if the authentication is lost due to a power surge, software fault, loss of keep-alive messages, or other zeroization event. The following embodiments are illustrative of any implementation of remote cryptographic initialization and are not intended to limit the present disclosure unless otherwise stated.

Several key cryptography standards are known to the art such as, but not limited to, RSA, DSA, and ECDSA cryptography. Key cryptography, particularly asymmetric key cryptography, is generally characterized by a private (secure) key that is only provided via authorized access and a public (insecure) key or certificate utilized to verify the private key. According to various embodiments, the public key or a plurality of public keys are stored by one or more remote devices. At least one local host device is enabled to securely initialize and access the remote devices with one or more paired private keys. The key pairing thus allows for unique identification and verification of the local host device (i.e. authorized access device) without requiring declassification of the remote device prior to initialization. The terms initialization, ignition, power up, activation, or startup may be used throughout the disclosure to generally refer to transitioning a device from an inactive state or low activity state to an active state whereupon secure data may be transferred or authorized actions may be performed.

Figure 1:
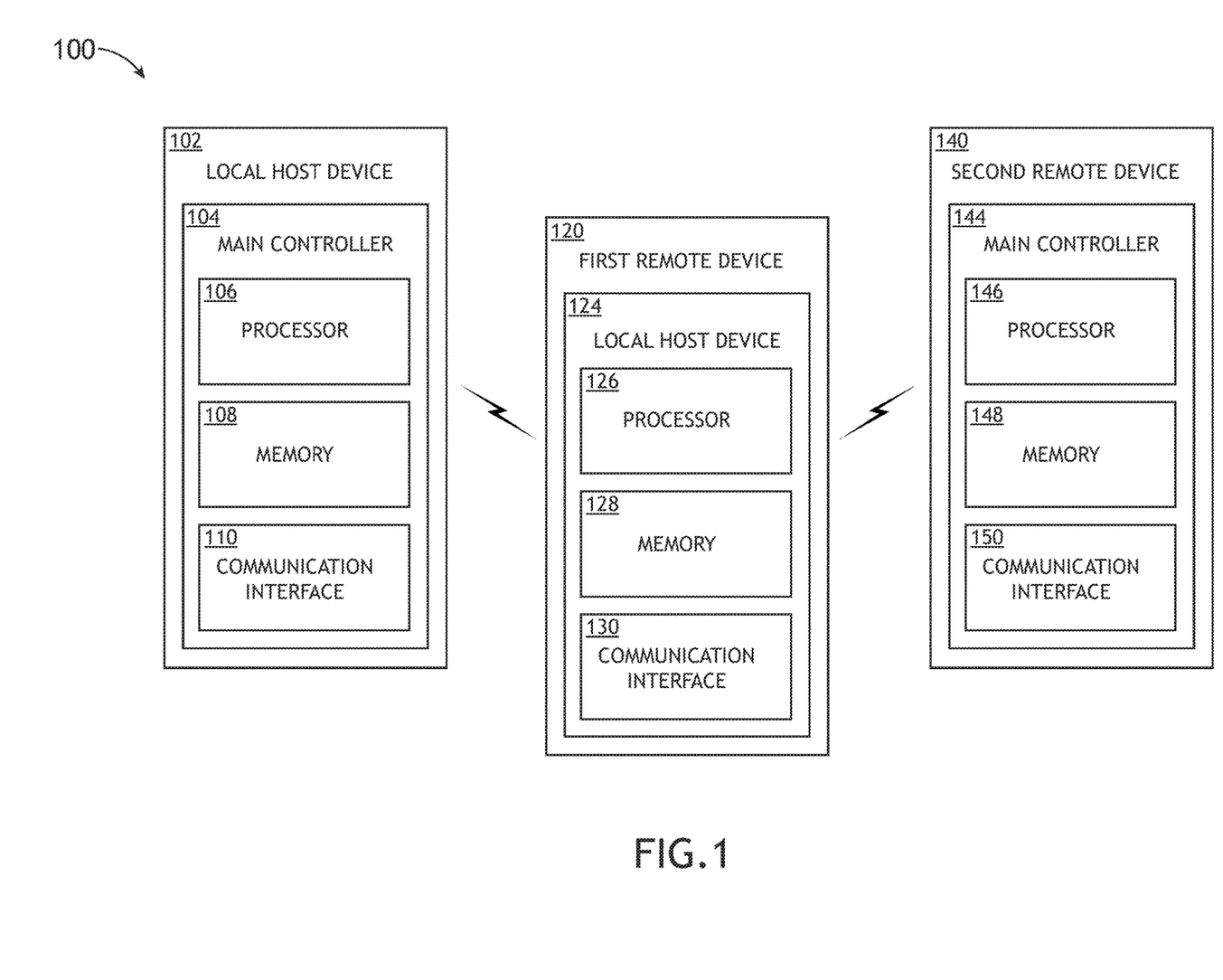
FIG. 1 is a block diagram illustrating a system for initializing one or more remote devices from a local host device, in accordance with an embodiment of this disclosure.

As illustrated in FIG. 1, a system 100 may include at least one local host device 102 in communication with one or more first remote devices 120. The system may also include one or more second remote devices 140 in communication with the one or more first remote devices 120 Each device 102, 120, 140 includes respective hardware, software, and/or firmware configured to execute the various functions or steps described herein. For example, each device 102, 110 may include at least one respective main controller. The main controller 104, 124, 144 being in communication with the system 100. The main controller 104, 124, 144 is configured to receive, process, and transmit data within the system 100. The main controller 104, 124, 144 includes one or more processors 106, 126, 146 configured to perform functions or steps according to program instructions stored in a memory 108, 128, 138. The main controller 104, 124, 144 is further configured to include a communication interface 110, 130, 150. The communication interface 110, 130, 150 is configured to facilitate data transfer data between components of the device (e.g., the local host device 102, the first remote device 120, and/or the second remote device 140) and/or other componentry within the system 100.

The processors 106, 126, 146 may include any type of processing elements, including but not limited to integrated circuits (e.g., application specific integrated circuits (ASIC) and field programmable gate arrays (FPGA). The memory 108, 128, 138 may also include resident or external memory for storing data, executable code, and other resident or external memory generated by the system 100. The main controller 104, 124, 144 can execute one or more software programs embodied in a non-transitory computer readable medium (e.g., memory 108, 128, 138) that implement techniques described herein. In some embodiments, the main controller 104, 124, 144 is not limited by the materials from which it is formed or the processing mechanisms employed therein and, as such, can be implemented via semiconductor(s) and/or transistors (e.g., using electronic integrated circuit (IC) components), and so forth.

The memory 108, 128, 138 can be an example of tangible, computer-readable storage medium that provides storage functionality to store various data and/or program code associated with operation of the system 100 and/or main controller 104, 124, 144, such as software programs and/or code segments, or other data to instruct the main controller 104, 124, 144, and possibly other components of the system 100, to perform the functionality described herein. Thus, the memory 108, 128, 138 can store data, such as a program of instructions for operating the main controller 104, 124, 144 and other components of the system. It should be noted that while a single memory 108, 128, 138 is described, a wide variety of types of combinations of memory 108, 128, 138 (e.g., tangible, non-transitory memory) may be employed. The memory can be integral with the main controller 104, 124, 144, can comprise stand-alone memory, or can be a combination of both. Some examples of the memory 108, 128, 138 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 110, 130, 150 can be operatively configured to communicate with componentry within the local host device 102, the first remote device 120 and the second remote device 140. For example, the communication interface 110, 130, 150 may be configured to retrieve data from the main controller 104, 124, 144, transmit data for storage in the memory 108, 128, 138, retrieve data from storage in the memory 108, 128, 138, and so forth. The communication interface 110, 130, 150 can also be communicatively coupled with the main controller 104, 124, 144 to facilitate data transfer between components of the system 100 and the main controller 104, 124, 144.

It should be noted that while the communication interface 110, 130, 150 is described as a component of the local host device 102, the first remote device 120 and/or the second remote device 140, one or more components of the communication interface 110, 130, 150 may be implemented as external components communicatively coupled to the local host device 102, the first remote device 120 and/or the second remote device 140 via a wired and/or wireless connection.

According to various embodiments, the local host device 102 is in communication with the one or more first remote devices 120 via any wired or wireless communication protocol known to the art, such as a direct transmission link, local area network, wireless area network, and the like. Further, the devices 102 and 110 may be communicatively linked via secured or unsecured networking. Similarly, the first remote device 120 is in communication with the one or more second remote devices 140 via any wired or wireless communication protocol known to the art, such as a direct transmission link, local area network, wireless area network, and the like. Further, the devices 120, 140 may be communicatively linked via secured or unsecured networking.

In embodiments, multiple levels of remote devices may be implemented within the system (e.g., as in links within a chain). For example, the second remote device 140 may be in communication with one or more third remote devices. In another example, the third remote device may be in communication with one or more fourth remote devices. Therefore, the above description should not be interpreted as a limitation of the present disclosure, but merely an illustration.

In some embodiments, a remote device 120 and/or the second remote device 140 is configured to only exchange insecure data until initialization to prevent security breaches, such as hacked (unauthorized) access, especially in situations where data is exchanged over unsecured networks. The local host device 102 may be configured to provide secured user access utilizing a secure input value.

Figure 2:
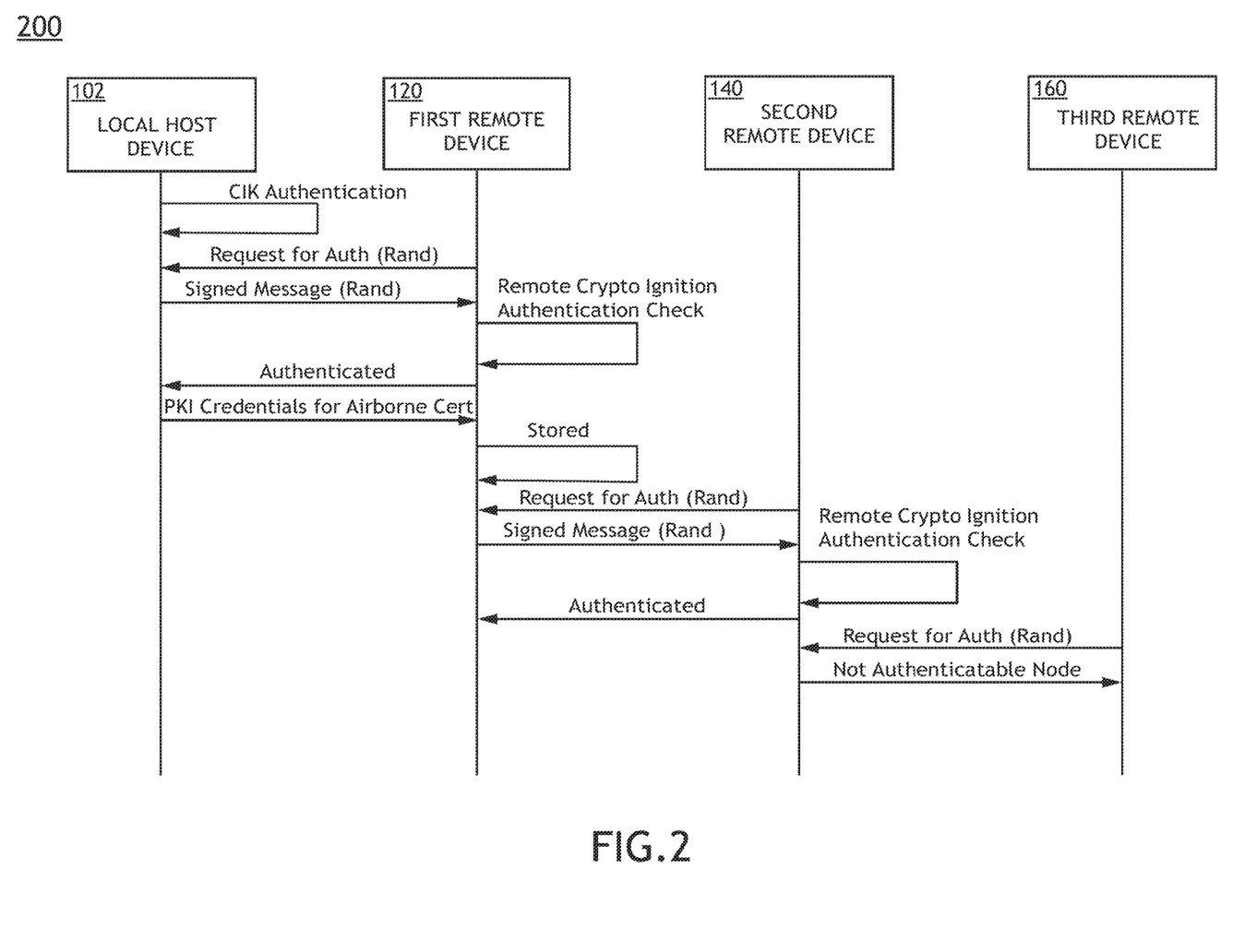
FIG. 2 is a block diagram illustrating hierarchal authentication of local and mobile remote devices within the system, in accordance with an embodiment of this disclosure.

FIG. 2 is a block diagram 200 illustrating hierarchal authentication of the local mobile remote devices 102, 120, 140 within the system 100. In some embodiments, the local host device 102 is configured to initiate a cryptographic authorization sequence with the first remote device 120 after receiving the secure input value which may include a user entered PIN or a pass code stored by at least one carrier medium (e.g. such as a hardware token or CIK) interfaced with the local host device 102. For example, once ignited, the local host device 102 may be capable of key generation and the generation of other sensitive material (e.g., PKI keymat).

The first remote device 110 is configured to send an authorization request including an encryption value (e.g., randomly generated value ("rand")) to the local host device 102. In response, the local host device 102 is configured to send an approval response (e.g., in the form of a message, signed message, or an acknowledge message) including the encryption value encoded utilizing a private key to the first remote device 120. The first remote device 120 initializes when the encoded encryption value is verified or authenticated utilizing a public key. This type of authentication may be termed a challenge-response authentication (i.e., a remote crypto ignition authentication check, a C/R authentication, or a C/R authentication check). After authentication, the local device 102 transmits a public key infrastructure certificate (i.e., PKI credentials) to the first remote device 102 where it is then stored (e.g., in a memory 128), giving the first remote device 120 the authority to authenticate the second remote device and other CIK-less devices.

The encryption value may contain any type of value of information that may be used for verification. Beyond, the aforementioned random value, the encryption value may contain any type of value or data including but not limited to time values (e.g., time signatures) and identifications. For example, the encryption value may include an electronic serial number (ESN). Authentication may include more than one encryption value and may include more than one type of encryption value. For example, an authentication request may include a random value and a time signature. In another example, the authentication request may include a random value and an ESN.

The first remote device 120, having received PKI credentials, may then receive a request for authorization from one or more second remote devices 140 (e.g., the second remote device 140 is configured to send an authorization request, including a randomly generated value, to the first remote device 120). In response, the first remote device 120 is configured to send an approval response including the encryption value encoded utilizing a private key to the second remote device 140. The second remote device 140 initializes when the encoded encryption value is verified or authenticated using a public key.

In embodiments, the first remote device 120 does not transfer or distribute PKI credentials to the second remote device 140 (i.e., only the local host device 102 and the first remote device 120 can authenticate remote devices, as only the local host device 102 and the first remote device 120 have PKI credentials. For example, the second remote device 140 may receive a request for authorization from a third remote device 160. However, the second remote device may not authenticate (e.g., send an approval response to) the third remote device 160, as the second remote device 140 does not have privileges to do so (e.g., does not have PKI credentials). In other words, the second remote device is configured to be incapable of initializing a third remote device.

It should be understood that an ignited first remote device 120 having PKI credentials will lose both authentication and PKI credentials if the first remote device undergoes a zeroization event. Upon a zeroization event, a first remote device 120 will need to be reignited by the local host device 102 or possibly another authenticated and PKI credentialed first remote device 120.

Figure 3:
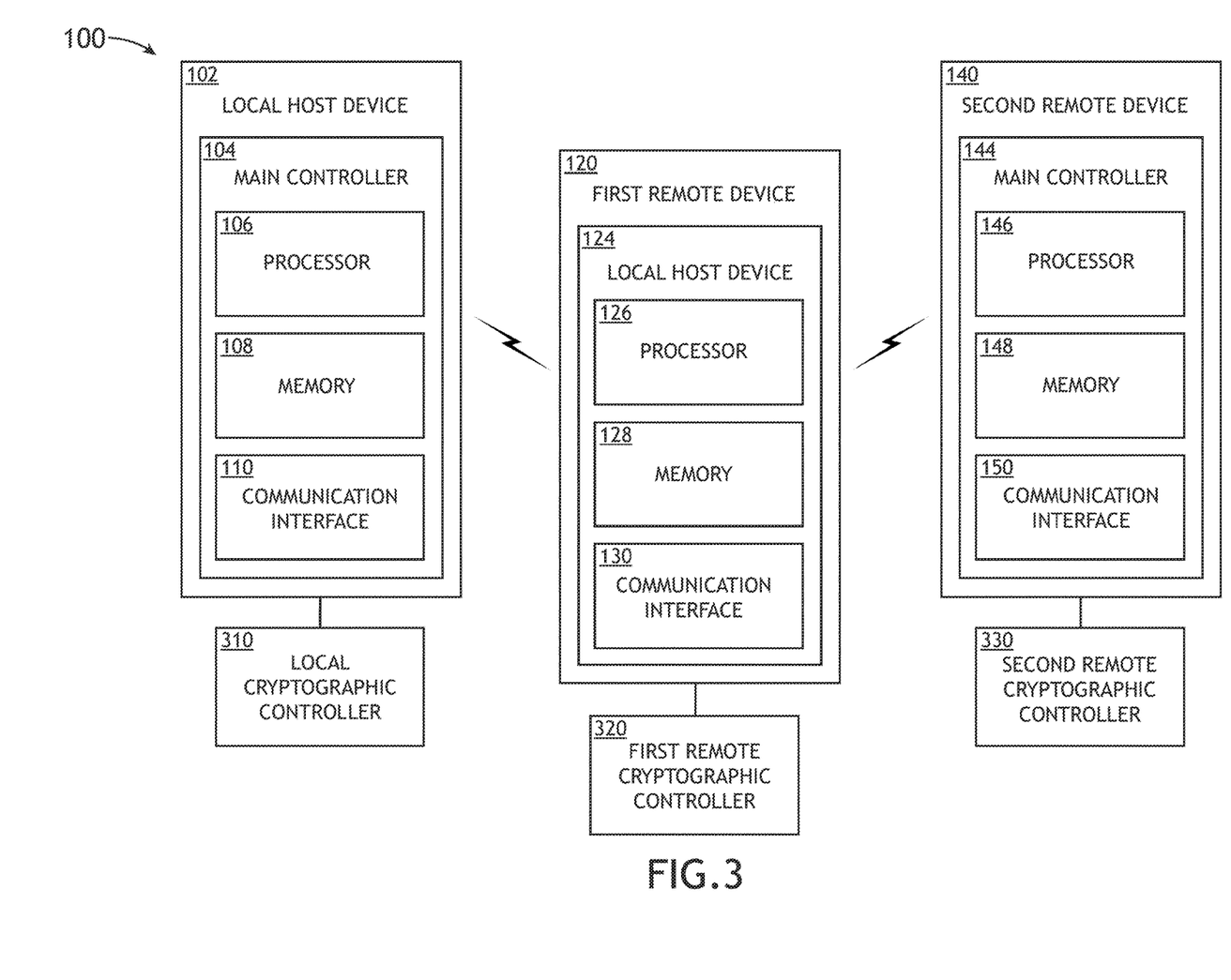
FIG. 3 is a block diagram illustrating the system wherein each of the local host device and the remote devices includes or is communicatively coupled to a respective cryptographic controller, in accordance with an embodiment of this disclosure.

In some embodiments, illustrated in FIG. 3, a system 300 further includes at least one local cryptographic controller 310, at least one first remote cryptographic controller 320, and at least one second remote cryptographic controller 330. The cryptographic controllers 310, 320, 330 may be communicatively coupled to or integrated with the respective local host device 102, first remote device 120 and second host device. 140. For example, each cryptographic controller 310, 320, 330 may be embodied in a separately linked device. Alternatively, each controller 310, 320, 330 may form a portion of the hardware, software, and/or firmware of the respective local host device 102, first remote device 120 and second remote devices 140.

The first remote cryptographic controller 320 may be configured to generate an encryption value for inclusion in each authorization request sent by the first remote device 120. For example, the first remote cryptographic controller 320 may include a random number generator configured to generate a 2^N value, such as a 32-bit or 64-bit encryption value. Accordingly, an arbitrarily large number of secure initializations may be performed between the local host device 102 and the remote device 110 with low risk of repeated credentials.

Similarly, the second remote cryptographic controller 330 may be configured to generate an encryption value for inclusion in each authorization request sent by the second remote device 140. For example, the second remote cryptographic controller 330 may include a random number generator configured to generate a 2^N value, such as a 32-bit or 64-bit encryption value. Accordingly, an arbitrarily large number of secure initializations may be performed between the first remote device 120 and the second remote device 140 with low risk of repeated credentials.

The first local cryptography controller 310 may be configured to sign or encode the encryption value received in the authorization request from the first remote device 120 utilizing the private key. When the approval response including the encoded value is returned to the first remote device 120, the first remote cryptographic controller 320 is further configured to verify or decode the response value utilizing the public key. For example, the asymmetric relationship between the private key and the public key may enable the first remote cryptographic controller 320 to determine whether the approval response includes the same encryption value that was sent by the first remote device 120 in the authorization request.

Similarly, the second local cryptography controller 330 may be configured to sign or encode the encryption value received in the authorization request from the second remote device 140 utilizing the private key. When the approval response including the encoded value is returned to the second remote device 140, the second remote cryptographic controller 330 is further configured to verify or decode the response value utilizing the public key. For example, the asymmetric relationship between the private key and the public key may enable the second remote cryptographic controller 320 to determine whether the approval response includes the same encryption value that was sent by the second remote device 140 in the authorization request.

It should be understood that the authorization requests, the encryption values, the private keys, the public keys, and the acknowledgement messages may differ when utilized between the local host device 102 and first remote device 120 pair and the first remote device 120 and second remote device pair. For example, in the authentication protocol between the local host device 102 and the first remote device 120, the authorization request, the encryption value, the private key, the public key, and the acknowledgement message may be considered a first authorization request, a first encryption value, a first private key, a first public key, and a first acknowledgement message, whereas in the authentication protocol between the first remote device 120 and the second remote device 140, the authorization request, the encryption value, the private key, the public key, and the acknowledgement message may be considered a second authorization request, a second encryption value, a second private key, a second public key, and a second acknowledgement message. In this manner different keys and messages may be used in systems 100 having longer authentication chains (e.g., systems having a third remote device 160 that is authorized for authentication by a second remote device having PKI credentials, and so on).

It should also be understood that the digital certificates (e.g., the entities that certifies the ownership of a public key by the named subject of the certificate) of the system 100 are tightly controlled. For example, root certificates created by the authorizing agency are placed within the cryptographic controllers of the local host device 102, the first remote device 120 and the second remote device 140 (e.g., for PKI chain verification), wherein the root private key is held by the authorizing authority (e.g., the root privacy key generally does not leave the authorizing agency).

In another example, intermediate certificate and intermediate private keys are generated and/or signed by the root private key at the authorizing agency. These intermediate certificates are also stored within the cryptographic controllers of the local host device 102, the first remote device 120 and the second remote device 140 (e.g., for PKI chain verification), wherein the intermediate private key is stored within the local host cryptographic controller for PKI key generation (e.g., the intermediate private key generally does not leave the local host device 102). It should be noted that the local host device 102 is generally operated by a human user.

In still another example, end entity certificates and private keys are generated and/or signed by the intermediate key within the local host cryptographic controller. These end entity certificates are also stored within the cryptographic controllers of the local host device 102, the first remote device 120 and the second remote device 140 (e.g., for PKI chain verification), where the end entity private keys are stored in the cryptographic controllers of the first remote device 120 and the second remote device 140, where they are used for challenge-response authentication. Generally, the end entity keys are active (e.g., 'live') for one week.

In embodiments, private keys and certificates that are transmitted from the local host cryptographic controller 310 to the first remote cryptographic controller 320 and/or the second cryptographic controller 330 are signed for integrity/authenticity. White Lists, containing electronic serial numbers (ESNs) of cryptographic controllers that belong in the system 100 will be distributed to all cryptographic controllers in the system 100. ESNs of cryptographic controllers not found in the White List will be rejected from performing the authentication protocols as described herein.

Figure 4:
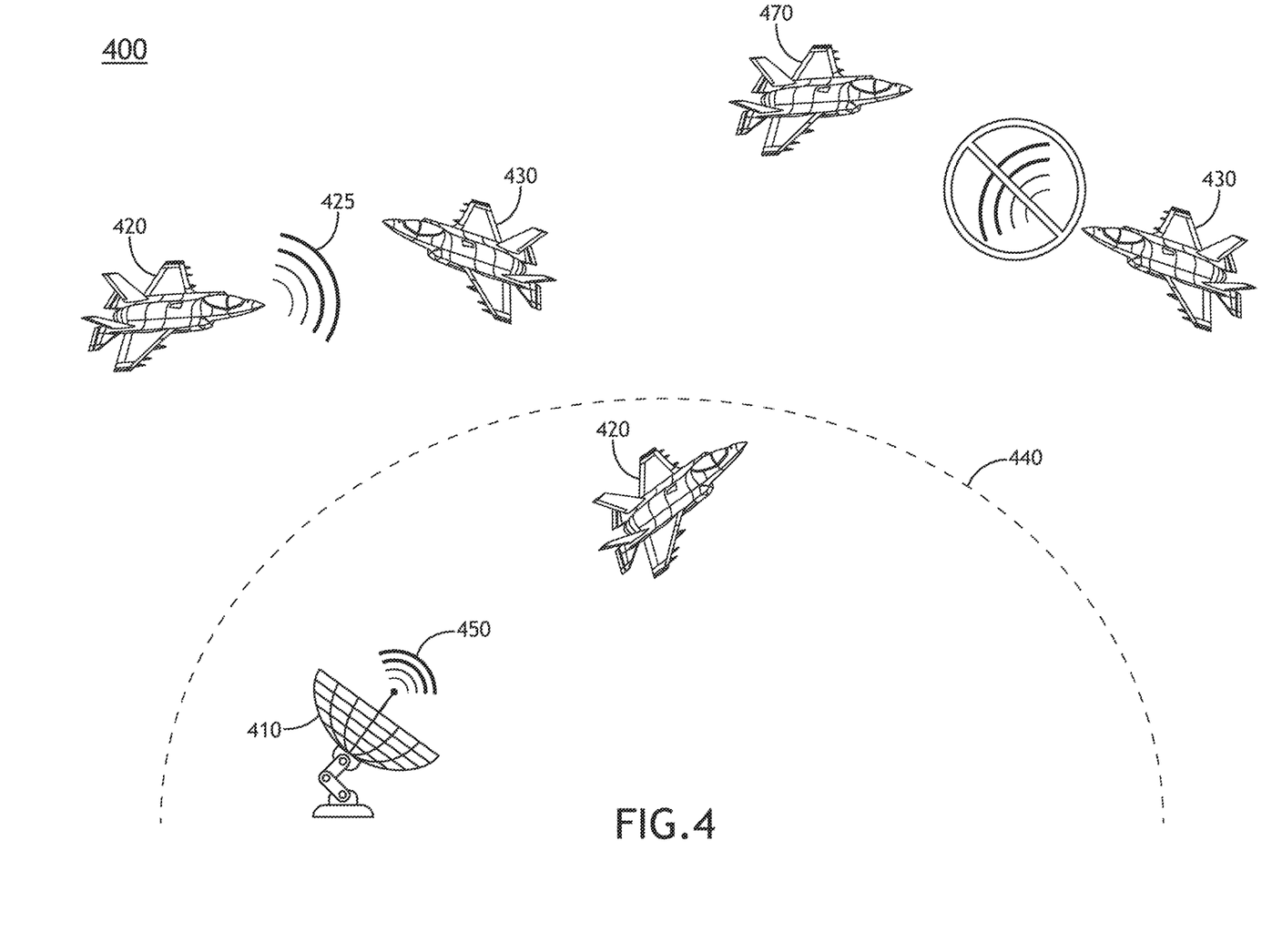
FIG. 4 illustrates a diagram of an environment of the system, in accordance with an embodiment of this disclosure.

FIG. 4 is an illustration of an environment 400 for the system 100, 300, in accordance with one or more embodiments of this disclosure. In embodiments, the environment 400 includes a base transmitter 410 housing the local host device 102 and the host cryptographic controller 310. The devices and controllers for the system 100, 300 are not shown for the sake of clarity. The environment 400 further includes a first aircraft 420 housing the first remote device 120 and the first remote cryptographic controller 320. The environment further includes a second aircraft 430 housing the second remote device 140 and the second remote cryptographic controller. The environment 400 further includes a remote ignition range 440 (e.g., the dotted half-circle).

The remote ignition range 440 denotes the range by which the base transmitter 410, via the local host device 102 and the host cryptographic controller 310, can act to remotely ignite the first aircraft 420 (e.g., via the first remote device 120 and the first remote cryptographic controller 320). For example, if the first aircraft 420 is within the remote ignition range 440, the base transmitter 410 may send a first transmission 450 (e.g., a first approval response) to the first aircraft 420, resting in authentication and ignition. In another example, if the first aircraft 420 is outside of the remote ignition range 440 and loses authentication (e.g., via power surge, software fault, or other zeroization accident), the first aircraft 420 will need to fly back to within the remote ignition range 440 to receive another first transmission 450 from the base transmitter 410 and reignite. At this time the base transmitter 410 may also send PKI credentials to the first aircraft 420

The environment 400 further includes the first aircraft 420 sending a second transmission 460 (e.g., via the first remote device 120 and the first remote cryptographic controller 320 to ignite the second aircraft 430 (e.g., via the second remote device 140 and the first remote cryptographic controller 330). For example, if the second aircraft 430 is outside of the remote ignition range 440 and loses authentication, the second aircraft may send a request for authentication to the first aircraft 420. The first aircraft 420, having PKI credentials, then sends one or more second transmissions 460 to the second aircraft 430, authenticating and igniting the second aircraft 430 using the protocol as described herein. In this manner, a single (e.g., or possibly more than one) aircraft that has been given PKI credentials may authenticate multiple aircraft within a group of aircraft that have flown beyond the remote ignition range 440. Only one aircraft, the first aircraft 420, would need to fly to within the remote ignition range 440 to reignite. This system 100, 300 prevents multiple aircraft from having to fly within the remote ignition range to ignite, saving time and effort, as well as creating a safer environment for attaining mission objectives. By limiting the number of airborne units with PKI credentials to one (e.g., or fewer than the number of aircraft in the group), the system 100, 300 simplifies the hierarchal organization required for reignition.

The environment 400 may further includes a third aircraft 470 that has requested authentication from the second aircraft 430. The second aircraft 430 does not have PKI credentials and is therefore not able to authenticate the third aircraft 470. Rather, the third aircraft 470 must request authentication from the first aircraft 420 or fly to within the remote ignition range 440 to reignite via the base transmitter 410. Once the base transmitter 410, the first aircraft 420, and the second aircraft 430 are authenticated and ignited, the entities will be able to communicate with each other via a shared encryption protocol.

In embodiments, the system 100, 300 may include vehicles, machinery or equipment coupled to or integrated with the first remote device 120 or second remote device 140. For example, the first remote device 120 and/or second remote device 140 may drive an ignition source 304 (e.g. starter) for an engine or motor of an aircraft, boat, or ground vehicle. In some embodiments, the machinery or equipment may include an unmanned ground, air, or water vehicle. In unmanned applications, the remote cryptographic initialization scheme described herein may alleviate concerns of limited user space and physical access to controls, thereby allowing unmanned machinery and equipment to be built on a smaller scale. In some embodiments, the first remote device 120 and/or second remote device 140 is configured to send/receive secure data (e.g. location or status information) or execute selected controls only after initialization to ensure that remote access limited to authorized users via a properly paired local host device 102.

Figure 5:
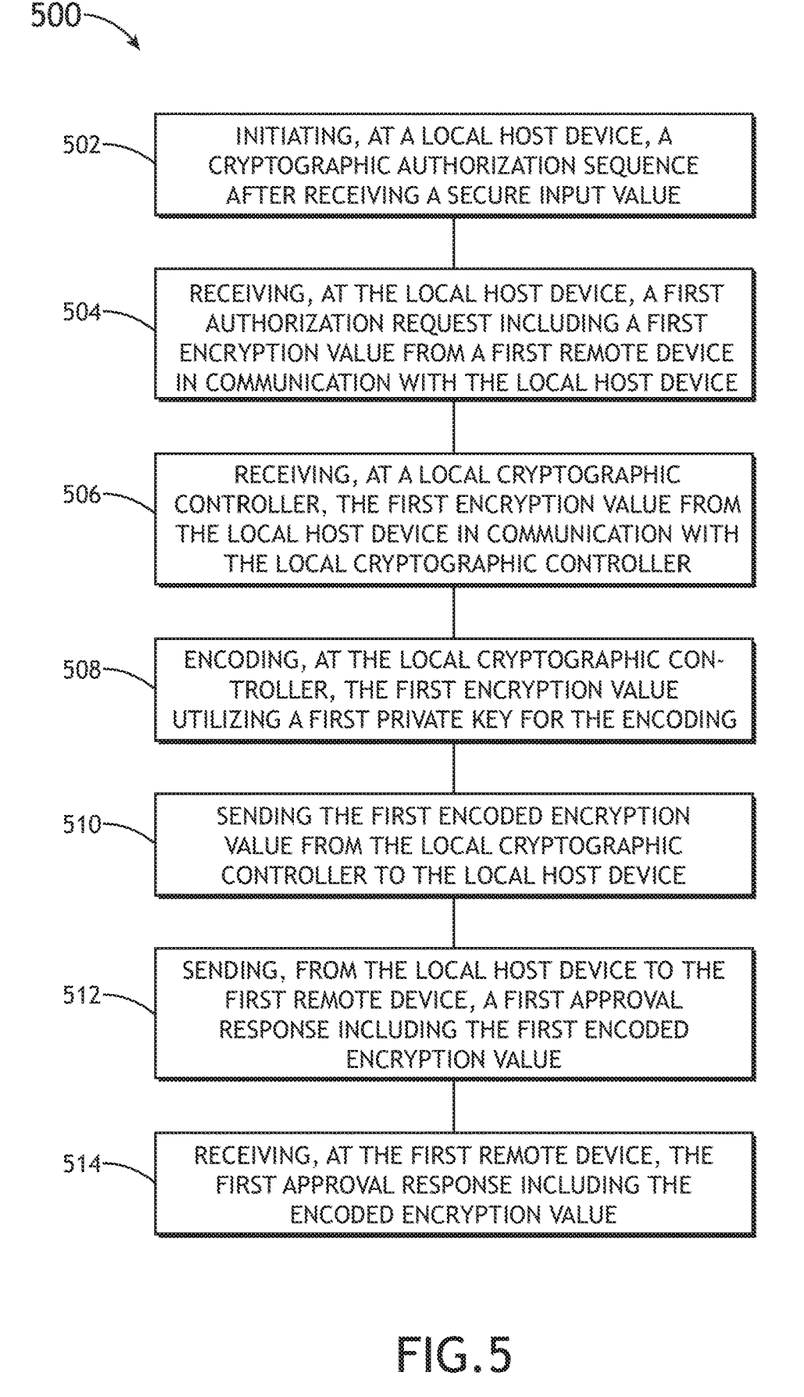
FIG. 5 is a flow diagram illustrating a method of cryptographically initializing a remote device, in accordance with an embodiment of this disclosure.

FIG. 5 illustrates a method 500 of cryptographically initializing a remote device 110 in accordance with the foregoing systems 100, 300. Accordingly, method 500 may include any step expressed or implied by the foregoing embodiments of the system 100, 300. Further, it is contemplated that one or more steps of method 500 may be executed by a system or device known to the art beyond those described above. As such, method 500 should be understood to encompass any configuration for carrying out the following steps.

The method 500 includes a step 502 of initiating, at the local host device 102, a cryptographic authorization sequence after receiving a secure input value. The method 500 further includes a step 504 of receiving, at the local host device 102, the first authorization request including the first encryption value from the first remote device in communication with the local host device 102.

The method 500 further includes a step 506 of receiving, at a local cryptographic controller 310, the first encryption value from the local host device 102 in communication with the local cryptographic controller 310. The method 500 further includes the step 508 of encoding, at the local cryptographic controller 310, the first encryption value utilizing a first private key for the encoding. In some embodiments, the first private key is stored by the local cryptographic controller 310. In some embodiments, the first public key is stored by the first remote cryptographic controller 320. The method 500 further includes a step 510 of sending the first encoded encryption value from the local cryptographic controller 310 to the local host device 102. The method 500 further includes a step 512 of sending, from the local host device 102 to the first remote device 120, a first approval response including the first encoded encryption value.

The method 500 further includes a step 514 of receiving, at the first remote device 102, the first approval response including the encoded encryption value. The method 500 further includes a step 516 of receiving, at a first remote cryptographic controller 310, the first encoded encryption value for verification from the first remote device 102 in communication with the first remote cryptographic controller 310. The method 500 further includes a step 518 of decoding, at the first remote cryptographic controller 310, the first encryption value utilizing a first public key for the decoding.

The method 500 further includes a step 520 of initializing the first remote device 120 using the first approval response when the first encoded encryption value is decoded at the first remote cryptographic controller 320 and the first encryption value is verified, wherein initializing the first remote device 120 authorizes transitioning the first remote device 120 to an active state to enable the first remote device 120 to engage in one or more communications over a secured network. The method 500 further includes a step 522 of sending, from the first remote device 120 to the local host device 102, a first acknowledgement message to acknowledge initialization of the first remote device 120. The method further includes a step 524 of receiving, at the local host device 102, the first acknowledgement message from the first remote device 20. The method 500 further includes a step 526 of securely sending, from the local host device 102 to the first remote device 120, a public key infrastructure certificate containing the second private key. For example, the public key infrastructure certificate may be sent via a secure tunnel. The method 500 further includes a step 528 of receiving, at the first remote host device 102, the public key infrastructure certificate.

In should be understood that although communication between authenticated devices may be sent securely through via the cryptographic methods and systems described herein, in some embodiments, one or more non-secure communications may also be sent between authenticated devices in addition to the sending and receiving of secure communications. For example, the local host device 102 may initially send a non-secure communication containing a message of salutation to the first remote device 120, then send secure operationally related communications to the first remote device 120 (e.g., revocation lists, key loading information, key deletion, key agility information, or zeroization information).

In embodiments, the method 500 further includes a step 530 of receiving, at the first remote device 120, a second authorization request including a second encryption value from a second remote device 140 in communication with the first remote device 120. The method 500 further includes a step 532 of receiving, at the first remote cryptographic controller 320, the second encryption value from the first remote device 120 in communication with the first remote cryptographic controller 320. The method 500 further includes a step 534 of encoding, at the first remote cryptographic controller 320, the second encryption value utilizing a second private key for the encoding. In some embodiments, the second private key is stored by the first remote cryptographic controller 320. In some embodiments, the second public key is stored by the second remote cryptographic controller 330.

The method 500 further includes a step 536 of sending the second encoded encryption value from the first remote cryptographic controller 320 to the first remote device 120. The method 500 further includes a step 538 of sending, from the first remote device 120 to the second remote device 140, a second approval response including the second encoded encryption value. The method 500 further includes a step 540 of receiving, at the second remote device 140, the second approval response including the second encoded encryption value. The method 500 further includes a step 542 of receiving, at a second remote cryptographic controller 330, the second encoded encryption value for verification from the second remote device 140 in communication with the first remote cryptographic controller 320.

The method 500 includes the step 544 of decoding, at the second remote cryptographic controller 330, the second encryption value utilizing a second public key for the decoding. The method 500 includes the step 546 of initializing the second remote device 140 using the second approval response when the second encoded encryption value is decoded at the second remote cryptographic controller 330 and the second encryption value is verified, wherein initializing the second remote device authorizes transitioning the second remote device 140 to an active state to enable the second remote device 140 to engage in one or more communications over the secured network. The method 500 further includes the step 548 of securely sending from the second remote device 140 to the first remote device 120, a second acknowledgement message to acknowledge initialization of the second remote device 140. The method further includes a step 550 of securely receiving, at the first remote device 120, the second acknowledgement message from the second remote device 140. It should be understood that securely sending and/or securely receiving a message may include sending and/or receiving a message that is encrypted. For example, the message may be encrypted prior to being sent, and decrypted after being received. The process of encryption and decryption of a message may also include a verification procedure.

In embodiments, the first public key matches the first private key and the second public key matches the second private key. For example, the first key pair (e.g., the first public key and first private key) may be equivalent to the second key pair (e.g., the second public key and the second private key). For instance, equivalent sets of key pairs may allow a second remote device 140 to reignite a first remote device 120. In another example, the first key pair is not equivalent to the second key pair. For example, non-equivalent sets of key pairs would not allow the second remote device 140 to reignite a first remote device 120. The decision to have equivalent or non-equivalent sets of key pairs depends on the security and/or usability needs of the user.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A method of remotely initializing at least one device comprising:

initiating, at a local host device, a cryptographic authorization sequence after receiving a secure input value;

receiving, at the local host device, a first authorization request including a first encryption value from a first remote device in communication with the local host device;

receiving, at a local cryptographic controller, the first encryption value from the local host device in communication with the local cryptographic controller;

encoding, at the local cryptographic controller, the first encryption value utilizing a first private key for the encoding;

sending a first encoded encryption value from the local cryptographic controller to the local host device;

sending, from the local host device to the first remote device, a first approval response including the first encoded encryption value;

receiving, at the first remote device, the first approval response including the first encoded encryption value;

receiving, at a first remote cryptographic controller, the first encoded encryption value for verification from the first remote device in communication with the first remote cryptographic controller;

decoding, at the first remote cryptographic controller, the first encryption value utilizing a first public key for the decoding;

initializing the first remote device using the first approval response when the first encoded encryption value is decoded at the first remote cryptographic controller and the first encryption value is verified, wherein initializing the first remote device authorizes transitioning the first remote device to an active state to enable the first remote device to engage in one or more communications over a secured network;

sending, from the first remote device to the local host device, a first acknowledgement message to acknowledge initialization of the first remote device;

receiving, at the local host device, the first acknowledgement message from the first remote device;

securely sending, from the local host device to the first remote device, a public key infrastructure certificate containing a second private key;

securely receiving, at the first remote device, the public key infrastructure certificate containing the second private key;

receiving, at the first remote device, a second authorization request including a second encryption value from a second remote device in communication with the first remote device, wherein the receiving the second authorization request occurs when the second remote device is outside a remote ignition range defining a maximum range for being capable of performing an initialization relative to the local host device;

receiving, at the first remote cryptographic controller, the second encryption value from the first remote device in communication with the first remote cryptographic controller;

encoding, at the first remote cryptographic controller, the second encryption value utilizing the second private key for the encoding;

sending a second encoded encryption value from the first remote cryptographic controller to the first remote device;

sending, from the first remote device to the second remote device, a second approval response including the second encoded encryption value;

receiving, at the second remote device, the second approval response including the second encoded encryption value;

receiving, at a second remote cryptographic controller, the second encoded encryption value for verification from the second remote device in communication with the first remote cryptographic controller;

decoding, at the second remote cryptographic controller, the second encryption value utilizing a second public key for the decoding;

initializing the second remote device using the second approval response when the second encoded encryption value is decoded at the second remote cryptographic controller and the second encryption value is verified, wherein initializing the second remote device authorizes transitioning the second remote device to the active state to enable the second remote device to engage in one or more communications over the secured network;

securely sending, from the second remote device to the first remote device, a second acknowledgement message to acknowledge initialization of the second remote device; and securely receiving, at the first remote device, the second acknowledgement message from the second remote device, wherein the first private key is stored by the local cryptographic controller and the first public key is stored by the first remote cryptographic controller, wherein the second private key is stored by the first remote cryptographic controller and the second public key is stored by the second remote cryptographic controller.

2. The method of claim 1, wherein the first remote device is implemented within a vehicle, machinery, or equipment.

3. The method of claim 1, wherein at least one of the first encryption value or the second encryption value comprises at least one of a random value, a time value, or an electronic serial number.

4. A system for remotely initializing at least one device comprising:

a first private and public key pair;

a local host device configured to: initiate a cryptographic authorization sequence after receiving a secure input value, receive a first authorization request, send a first approval response including a first encoded encryption value, receive a first acknowledge message, and send a public key infrastructure certificate;

a first remote device in communication with the local host device, the first remote device configured to: send the first authorization request including a first encryption value to the local host device, receive the first approval response and the first encoded encryption value from the local host device, send the first acknowledge message to the local host device, and receive the public key infrastructure certificate from the local host device;

a local cryptographic controller in communication with the local host device, the local cryptographic controller configured to: receive from the local host device, the first encryption value, encode the first encryption value utilizing a first private key, and send the first encoded encryption value to the local host device; and a first remote cryptographic controller in communication with the first remote device, the first remote cryptographic controller configured to:
  verify the first encryption value received from the first remote device by decoding the first encoded encryption value with a first public key paired with the first private key;
  send a first message to the first remote device verifying the first approval response is valid, wherein the first remote device configured to initialize to an active state upon receipt of the first acknowledge message, wherein the first remote device being further configured to securely communicate after initialization;
  receive a second authorization request;
  send a second approval response including a second encoded encryption value; and
  receive a second acknowledge message;

a second private key pair;

a second public key pair; and a second remote device in communication with the first remote device, the second remote device configured to: send the second authorization request including a second encryption value to the first remote device, receive the second approval response and the second encoded encryption value from the first remote device, and send the second acknowledge message to the first remote device, wherein the second remote device is configured to perform the sending of the second authorization request when the second remote device is outside a remote ignition range defining a maximum range for being capable of performing an initialization relative to the local host device, wherein the first remote cryptographic controller is further configured to: receive from the first remote device, the second encryption value, encode the second encryption value utilizing a second private key, and send the second encoded encryption value to the first remote device, further comprising a second remote cryptographic controller in communication with the first remote device, the second remote cryptographic controller configured to: verify the second encryption value received from the second remote device by decoding the second encoded encryption value with a second public key paired with the second private key, and send a second message to the second remote device verifying the second approval response is valid, the second remote device being configured to initialize to the active state upon receipt of the second message, and the second remote device being further configured to securely communicate after the initialization, wherein the first private key is stored by the local cryptographic controller and the first public key is stored by the remote cryptographic controller, wherein the second private key is stored by the first remote cryptographic controller and the second public key is stored by the second remote cryptographic controller.

5. The system of claim 4, wherein the first remote device is implemented within a vehicle, machinery, or equipment.

6. The system of claim 4, wherein at least one of the first encryption value or the second encryption value comprises at least one of a random value, a time value, or an electronic serial number.

* * * * *